US007997307B2

(12) United States Patent
Benjey

(10) Patent No.: US 7,997,307 B2
(45) Date of Patent: Aug. 16, 2011

(54) FILL NOZZLE POSITIONING APPARATUS

(75) Inventor: Robert Philip Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 923 days.

(21) Appl. No.: 11/929,088

(22) Filed: Oct. 30, 2007

(65) Prior Publication Data
US 2009/0107583 A1 Apr. 30, 2009

(51) Int. Cl.
B65B 1/04 (2006.01)
B65B 3/00 (2006.01)
(52) U.S. Cl. ...................... 141/350; 220/86.2
(58) Field of Classification Search ............ 141/312, 141/348–350; 220/86.2
See application file for complete search history.

(56) References Cited

U.S. PATENT DOCUMENTS

| 4,898,395 A * | 2/1990 | Kawase .................. 277/615 |
| 4,977,936 A * | 12/1990 | Thompson et al. ........ 141/312 |
| 5,291,924 A * | 3/1994 | Sausner et al. ............ 141/312 |
| 6,945,290 B1 * | 9/2005 | Benjey et al. ............. 141/302 |

FOREIGN PATENT DOCUMENTS

EP 1541403 A3 6/2005
WO 2004024488 A1 3/2004

* cited by examiner

Primary Examiner — Timothy L Maust
(74) Attorney, Agent, or Firm — Quinn Law Group, PLLC

(57) ABSTRACT

An apparatus for positioning a fill nozzle includes an elongated fill pipe assembly. An annular seal is operatively connected within the fill pipe assembly and defines a center aperture. The annular seal is sized to seal around the fill nozzle. First and second annular restrictions are provided within the fill pipe assembly. The first and second annular restrictions define first and second apertures that are sized to sufficiently restrict lateral movement of the fill nozzle within the fill pipe assembly to maintain sealing contact of the annular seal around the fill nozzle.

13 Claims, 4 Drawing Sheets

FILL NOZZLE POSITIONING APPARATUS

TECHNICAL FIELD

The invention relates to an apparatus for positioning a fill nozzle, such as a fuel fill nozzle, within a fill pipe assembly.

BACKGROUND OF THE INVENTION

Filling systems for a fluid storage tank, such as a fuel tank, are sometimes configured to retain gaseous vapors and to prevent fluid spills due to overfilling. Fluid and vapor retention typically requires the use of one or more reliable and durable seals.

Fuel fill systems, such as on vehicles, typically include a fuel tank with a fill pipe extending therefrom. A fuel fill nozzle is inserted into the fill pipe, and fuel is dispensed to refill the fuel tank. A sealing arrangement between the fuel fill nozzle and the fill pipe can be used as part of a system to control refueling vapor.

SUMMARY OF THE INVENTION

An apparatus for positioning a fill nozzle includes an elongated fill pipe assembly. An annular seal is operatively connected within the fill pipe assembly and defines a center aperture. The seal is sized to seal around the fill nozzle. First and second annular restrictions are provided within the fill pipe assembly. The first and second annular restrictions define first and second apertures that are sized to sufficiently restrict lateral movement of the fill nozzle within the fill pipe assembly to maintain sealing contact of the annular seal around the fill nozzle.

A fuel fill nozzle centering device for maintaining sealing contact of an annular seal about a fuel fill nozzle includes a fill pipe assembly having first and second annular restrictions axially spaced within the fill pipe assembly. The annular restrictions are configured to limit lateral movement of the fuel fill nozzle when the nozzle is inserted through the annular seal and the annular restrictions such that the annular seal maintains sealing contact with the fuel fill nozzle (i.e., the annular seal does not gap away from the fuel fill nozzle).

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
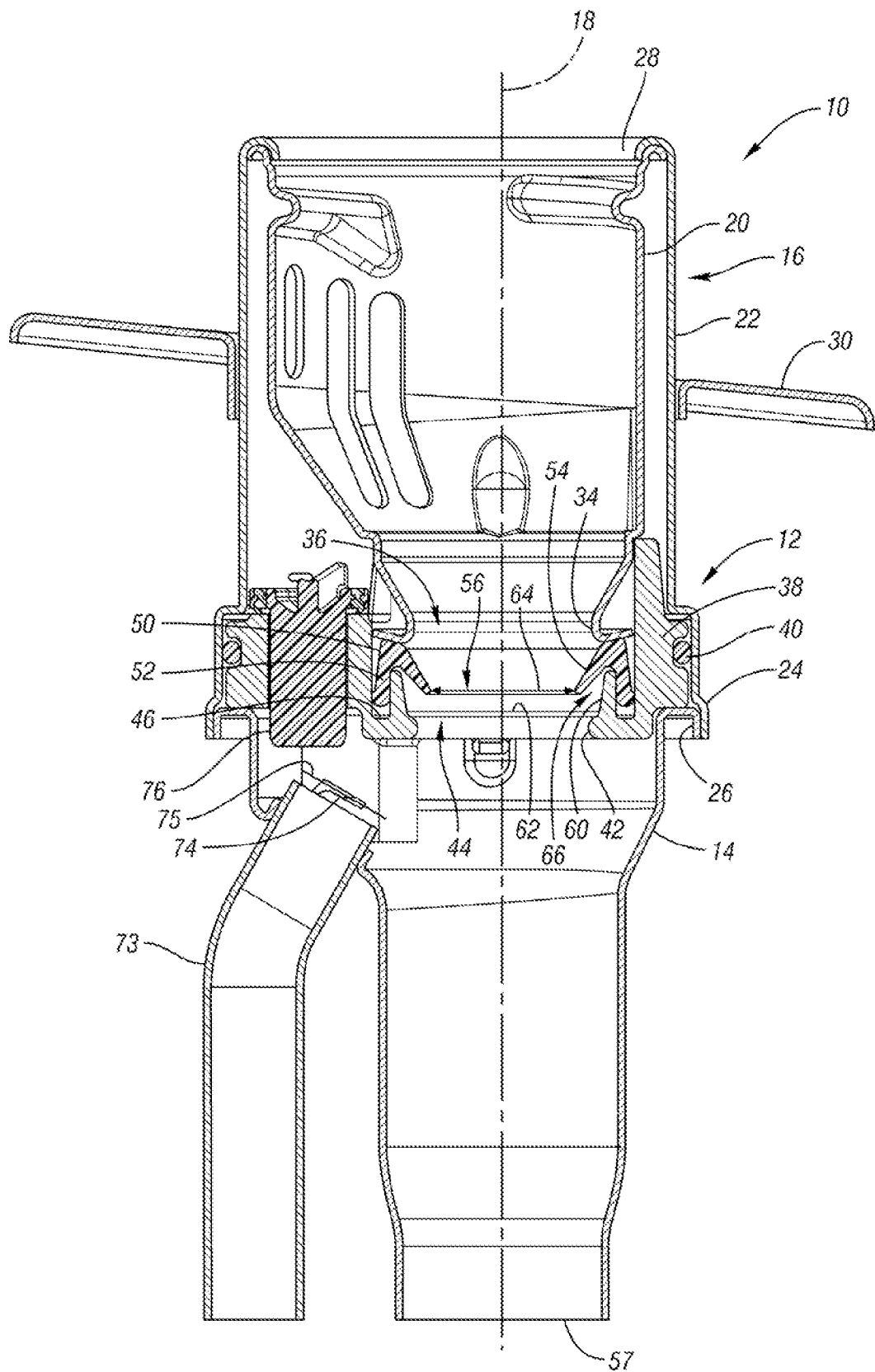
FIG. 1 is a schematic illustration in cross-sectional view of a first embodiment of a fuel fill nozzle positioning apparatus.
Figure 3:
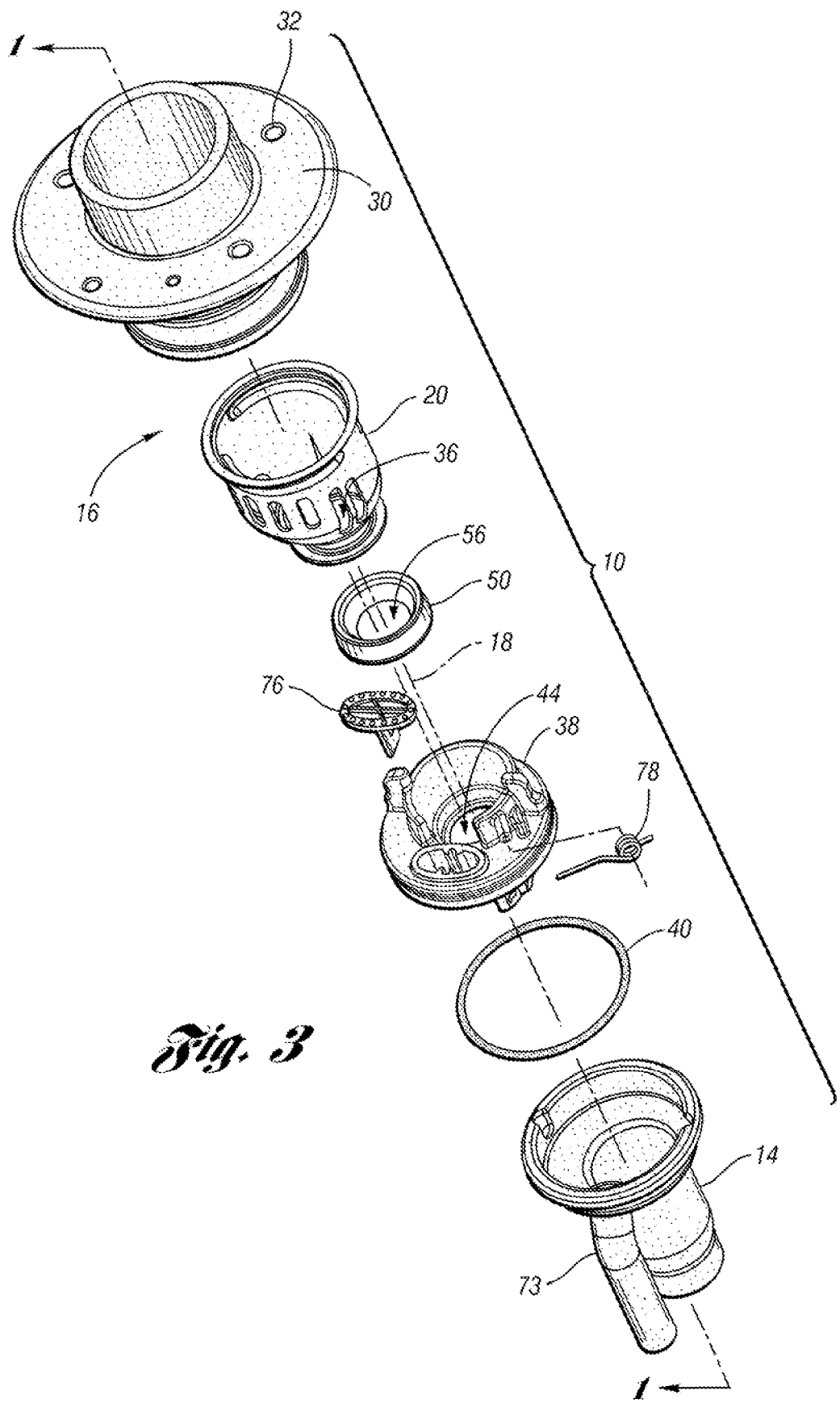
FIG. 3 is a schematic illustration in exploded view of the fuel fill nozzle positioning apparatus of FIGS. 1 and 2.

Referring to the drawings, wherein like reference numbers refer to like components, FIG. 1 illustrates a fuel fill nozzle positioning apparatus 10. The fuel fill nozzle positioning apparatus 10 includes an elongated fill pipe assembly 12 with an elongated fill tube 14 and a fill cup assembly 16. The fill tube 14 and fill cup assembly 16 are axially aligned with one another about a center axis 18. The fill cup assembly 16 includes an inner cup portion 20 and an outer wall portion 22. The outer wall portion 22 has a terminal annular flange 24 sized to fit over an annular flange 26 of the fill tube 14 for securement thereto by any known means, such as by welding or adhesives. Likewise, the inner cup portion 20 is secured to the outer wall portion 22 by crimping, welding, press-fitting or any other known means to define an inlet 28. A flange 30 is secured about the outer wall portion 22 and, as best shown in FIG. 3, includes fastener apertures 32 to allow fastening of the flange 30 to a support member, such as an automotive body panel.

The inner cup portion 20 tapers inward toward the center axis (i.e., radially inward) from the inlet 28 to a first rigid annular restriction 34, also referred to as a protrusion. The first rigid annular restriction 34 defines a first aperture 36 (partially visible in FIG. 3) that serves as an outlet of the cup portion 20.

A retaining member 38 is supported by the fill tube 14 and between the outer wall 22 and the cup portion 20 of the cup assembly 16. An O-ring 40 seals the retaining member 38 to the outer wall portion 22. The retaining member 38 forms a second rigid annular restriction 42, also referred to as a protrusion, defining a second aperture 44 (best shown in FIG. 3). The retaining member 38 is formed with a circumferential channel 46.

A flexible annular seal 50 is sandwiched between the inner cup portion 20 and the retaining member 38. The flexible annular seal 50 is of a material having some compliance or flexibility, allowing the seal 50 to maintain contact with a nozzle inserted through the center aperture 56, even when the nozzle is askew, as discussed further below. Such continuous contact may be desired in order to limit refueling vapor emissions from a fuel tank (not shown) into which an outlet 57 of the fuel fill tube 14 eventually empties. An additional section of the fill tube 14 or a separate tube extends from the fill tube outlet 57 to the tank. The flexible annular seal 50 includes a retention portion 52 nested within the circumferential channel 46. Furthermore, the flexible annular seal 50 includes an angled annular lip 54 that extends radially inward. The lip 54 defines a center aperture 56. The first, second, and center apertures 36, 44, 56, respectively, are axially aligned about center axis 18. The second restriction 42 is axially spaced from the lip 54 sufficiently to permit flexing of the seal 50 (e.g., flexing radially outward) without contacting the second restriction 42. In fact, the retaining member 38 forms an annular opening 60 adjacent the seal 50 that has a diameter 62 greater than a diameter 64 of the flexible seal 50, allowing the lip 54 to extend into the annular opening 60. A cavity 66 is defined between the lip 54 and the retaining member 38.

The first aperture 36, center aperture 56 and second aperture 44 are aligned with one another in that they are each centered about the axis 18 and are axially spaced from one another along the axis 18. The first and second apertures 36, 44, are on opposite sides of the center aperture 56.

Figure 2:
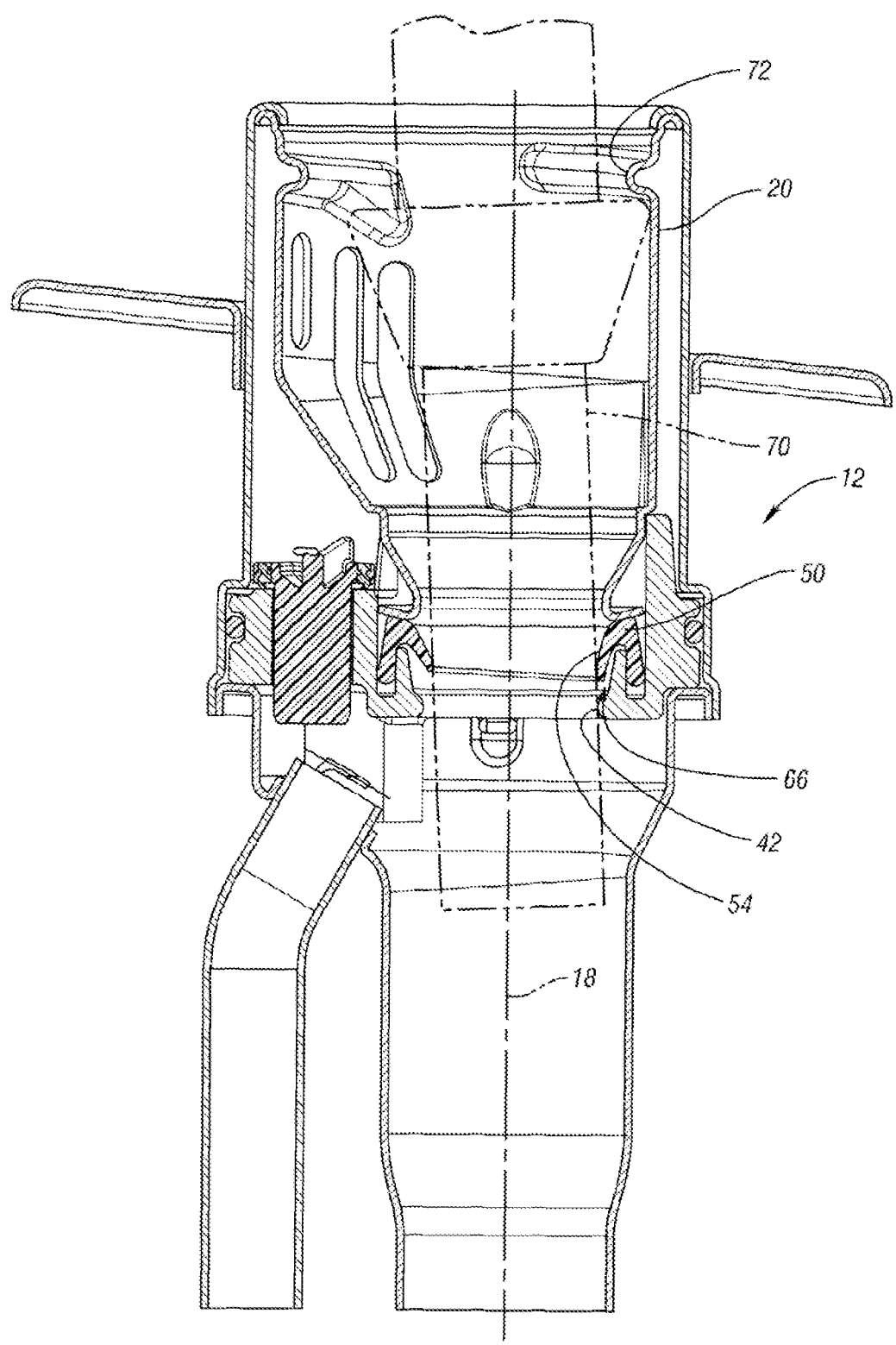
FIG. 2 is a schematic illustration in cross-sectional view of the fuel fill nozzle positioning apparatus of FIG. 1, with a fuel fill nozzle shown in phantom positioned therein.

Referring to FIG. 2, a fuel fill nozzle 70, shown in phantom, is illustrated inserted into the fill pipe assembly 12. A nozzle catch 72 formed to protrude inward from the inner cup portion 20 serves to axially position the fuel fill nozzle 70. As shown in FIG. 2, the fuel fill nozzle 70 may be inserted slightly askew with respect to the center axis 18. However, with the fuel fill nozzle 70 in this position, the second restriction 42 restricts the lateral movement or position of the nozzle 70 so that the lip 54 of the seal 50 flexes as shown, while maintaining sealing contact about the entire periphery of the fuel fill nozzle 70 without any gap between the lip 54 and the nozzle 70. The cavity 66 permits the seal 50 to flex under applied force of the nozzle 70 while preventing contact of the lip 54 with the retaining member 38 or with any other rigid components, thus preventing tearing or other undue wear of the seal 50. The first restriction 34 and the second restriction 42 may be referred to as a fuel fill nozzle centering device, as they cooperate to maintain the nozzle 70 within a predetermined lateral (i.e., radial) range about the center axis 18, with the seal 50 being specifically designed with a flexibility and compliance that will maintain sealing engagement to the nozzle 70 when the nozzle 70 is so confined by the first and second restrictions 34, 42.

Figure 4:
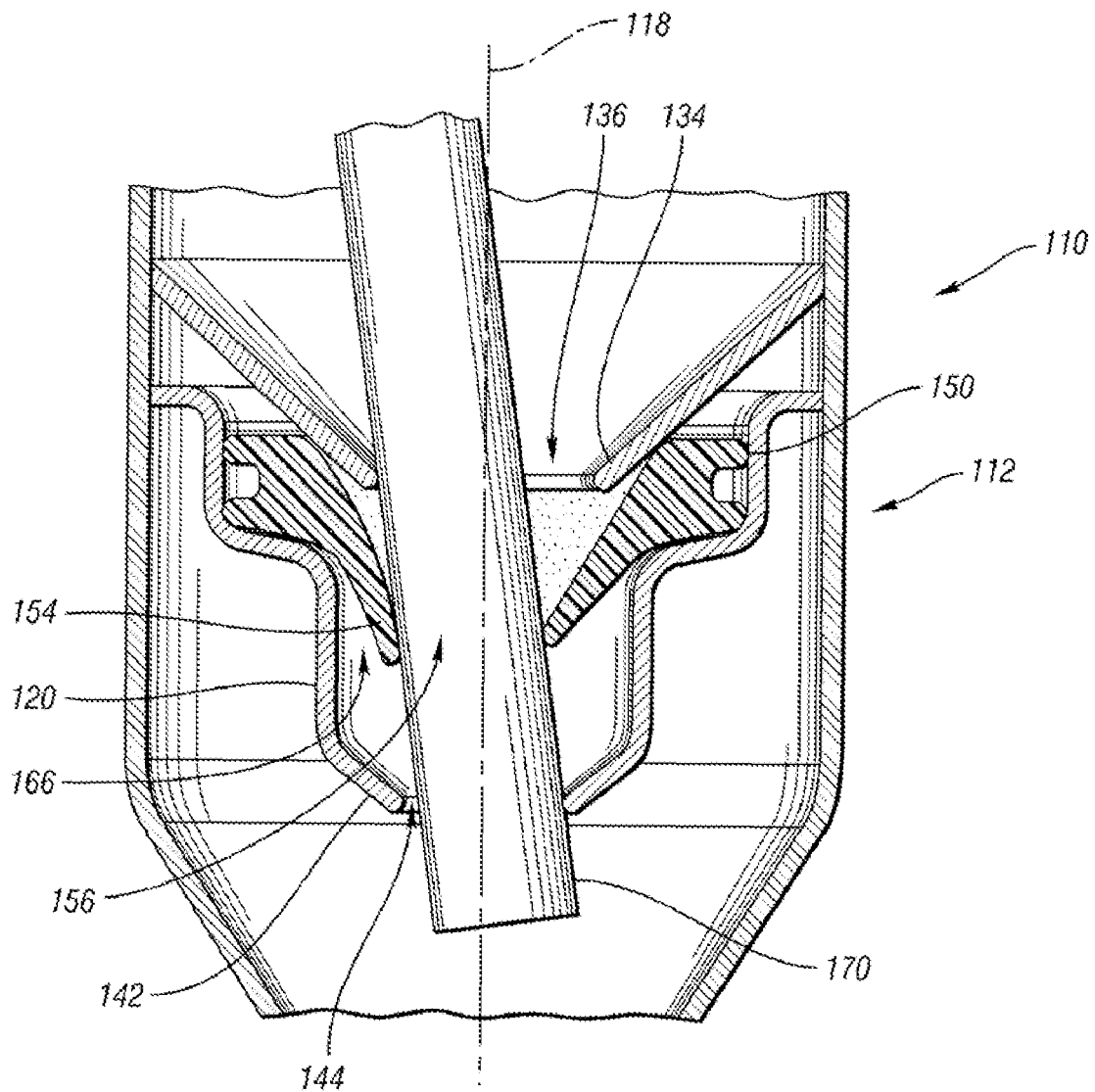
FIG. 4 is a schematic illustration in cross-sectional view of a second embodiment of a fuel fill nozzle positioning apparatus.

Referring to FIG. 4, another embodiment of a fuel fill nozzle positioning apparatus 110 is illustrated. The fuel fill nozzle positioning apparatus 110 includes an elongated fill pipe assembly 112, shown in fragmentary view. A first rigid restriction 134, which in this instance is a protrusion, defines a first aperture 136. A second rigid restriction or protrusion 142 defines a second aperture 144 aligned with the first aperture about a center axis 118. A flexible annular seal 150 is constrained between the first and second restrictions 134, 142 and defines a center aperture 156. The center aperture 156 is sized to allow the seal 150 to seal around the periphery of a fuel fill nozzle 170. The restrictions 134, 142, cooperate to act as a fuel fill nozzle centering device by preventing excessive tilt of the nozzle 170 with respect to the axis 118, thereby ensuring that the flexible annular seal 150 remains sealed to the nozzle 170 without gapping. As viewed in FIG. 4, the first restriction 134 interferes with further lateral movement of the nozzle 170 to the left while the second restriction 142 interferes with lateral motion of the nozzle 170 to the right. The left side of the seal 150 as shown is flexed radially outward due to force of the nozzle 170. A cup portion 120 of the fill pipe assembly 112 defines an annular cavity 166 around the seal 150 sized so that the flexed lip 154 does not contact the cup portion 120 or any other rigid components, thereby protecting the integrity of the seal 150.

It should be appreciated that, within the scope of the invention, the annular seal need not be between the first and second restrictions. Any two restrictions axially spaced sufficiently to restrict tilt of a fill nozzle can prevent gapping of an annular seal about the nozzle. Furthermore, the restrictions need not be protrusions, and may even be integrally formed at an axial distance from one another on a common tubular component.

Other features of the fill pipe assembly 12 of FIGS. 1-3 include a vapor recirculation tube 73 with a thin film check valve 75 that is supported by slots 74 (one shown) in the retaining member 38. The recirculation tube 73 allows air and fuel vapor within the tank (not shown) to travel from the tank up the tube 73, opening valve 75. A poppet valve 76 is supported by the retaining member 38. The poppet valve 76 is biased closed by a spring 78 (see FIG. 3), but opens when excess vapor pressure exists in the fill tube 14 and/or when the fill tube 14 is overfilled with fuel, possibly serving as back-up for other vapor refueling system valves (not shown) or for a fuel fill nozzle shut-off valve.

While the best modes for carrying out the invention have been described in detail, those familiar with the art to which this invention relates will recognize various alternative designs and embodiments for practicing the invention within the scope of the appended claims.

The invention claimed is:
1. An apparatus for positioning a fill nozzle comprising:
an elongated fill pipe assembly;
an annular seal operatively connected within the fill pipe assembly and defining a center aperture; wherein the seal is sized to seal around the fill nozzle;
a first annular restriction within the fill pipe assembly and defining a first aperture;
a second annular restriction within the fill pipe assembly and defining a second aperture;
wherein the first and second apertures are sized to sufficiently restrict lateral movement of the fill nozzle within the fill pipe assembly to maintain sealing contact of the annular seal around the fill nozzle;
wherein the annular seal is formed with an angled lip that extends radially inward;
wherein the second annular restriction is formed on a retaining member;
wherein the retaining member defines a circumferential channel radially outward of the second annular restriction;
wherein the annular seal has a retention portion radially outward of the lip; and
wherein the retention portion is nested within the channel with the retaining member surrounding the annular seal both radially inward and radially outward of the retention portion.

2. The apparatus of claim 1, wherein the first annular restriction is positioned between an inlet of the fill pipe assembly and the annular seal; and
wherein the annular seal is positioned between the first and second annular restrictions.

3. The apparatus of claim 1,
wherein the second annular restriction is spaced from the annular seal sufficiently to prevent contact of the lip with the second annular restriction when the seals flexes.

4. The apparatus of claim 1, wherein the retention portion defines an opening into which the angled lip extends; and
wherein the opening is sized sufficiently larger than the angled lip to define a cavity therebetween.

5. The apparatus of claim 4, wherein the first annular restriction contacts the seal radially outward of the angled lip to sandwich the seal between the first annular restriction and the second annular restriction.

6. The apparatus of claim 1, further comprising:
a nozzle catch extending inward within the fill pipe assembly and positioned to interfere with the fill nozzle to restrict axial movement thereof.

7. The apparatus of claim 1, wherein the first aperture is aligned with the center aperture; and wherein the second aperture is aligned with the first and center apertures.

8. The apparatus of claim 1, wherein the first annular restriction is larger than the second annular restriction.

9. The apparatus of claim 1, wherein the channel is substantially U-shaped.

10. An apparatus for positioning a fuel fill nozzle comprising:
an elongated fuel fill tube;
a cup assembly aligned with the fuel fill tube and having an inlet and a first protrusion extending radially inward and defining an outlet; wherein the cup assembly is tapered radially inward from the inlet to the outlet;
a retaining member supported by both the fuel fill tube and the cup assembly and restrained between the fuel fill tube and the cup assembly, radially surrounding the first protrusion and having a second protrusion extending radially inward and axially spaced from the first protrusion;

an annular seal supported by the retaining member between the first and second protrusions and defining a center aperture sized such that the seal seals around a fuel fill nozzle inserted therein; and wherein the first and second protrusions are sized to sufficiently restrict lateral movement of the fuel fill nozzle when the fuel fill nozzle is inserted through the center aperture to maintain sealing contact of the annular seal around the fuel nozzle.

11. The apparatus of claim 10, wherein the annular seal angles radially inward.

12. The apparatus of claim 10, wherein the annular seal is sufficiently spaced from the second protrusion to permit flexing of the annular seal without contacting the second protrusion.

13. The apparatus of claim 10, wherein the retaining member defines an annular opening adjacent the annular seal and having a diameter greater than a diameter of the center aperture to permit flexing of the annular seal without contacting the retaining member.

* * * * *